United States Patent [19]
Yamashita

[11] Patent Number: 5,905,697
[45] Date of Patent: May 18, 1999

[54] CHARACTER INPUT APPARATUS AND APPARATUS FOR RECORDING AND/OR REPRODUCING A RECORDING MEDIUM

[75] Inventor: Shinsuke Yamashita, Kanagawa, Japan

[73] Assignee: Sony Corporation, Tokyo, Japan

[21] Appl. No.: 08/748,677

[22] Filed: Nov. 13, 1996

[30] Foreign Application Priority Data

Nov. 22, 1995 [JP] Japan ..................................... 7-326250

[51] Int. Cl.[6] .................................................. G11B 17/22
[52] U.S. Cl. ............................................. 369/32; 707/104
[58] Field of Search .......................... 369/32, 33, 275.7, 369/58, 54, 47, 48; 707/104

[56] References Cited

U.S. PATENT DOCUMENTS 5,245,600  9/1993  Yamauchi et al. ......................... 369/32
5,689,704  11/1997  Yoshida et al. .......................... 395/615

Primary Examiner—Tan Dinh
Attorney, Agent, or Firm—Limbach & Limbach L.L.P.

[57] ABSTRACT

A character input apparatus for use with an optical disk recording or reproducing apparatus includes a memory, an input unit, and a controller. The memory stores different kinds of character data. The input unit selects character data, one character at a time, from the memory and determines and inputs the selected character data. The controller reads out the character data from the memory based on the character data selected by the input unit and holds this character data as determined data. The controller automatically reads out a first character data from a group of character data of the same kind to which the determined character data belongs when the input unit selects and determines the inputted character data after the input unit has inputted the determined character data.

9 Claims, 9 Drawing Sheets

FIG. 3

| | 16 bits | | 16 bits | | |
|---|---|---|---|---|---|
| | MSB — LSB | MSB — LSB | MSB — LSB | MSB — LSB | |
| Header | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector(00h) | MODE(02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| Corresponding Table Instructing Data Portion | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| Management Table Portion (255 Parts) Table | (01h) Start Address | | | Track Mode | 78 |
| | End Address | | | Link Info | 79 |
| | (02h) Start Address | | | Track Mode | 80 |
| | End Address | | | Link Info | 81 |
| | (03h) Start Address | | | Track Mode | 82 |
| | End Address | | | Link Info | 83 |
| | (FCh) Start Address | | | Track Mode | 580 |
| | End Address | | | Link Info | 581 |
| | (FDh) Start Address | | | Track Mode | 582 |
| | End Address | | | Link Info | 583 |
| | (FEh) Start Address | | | Track Mode | 584 |
| | End Address | | | Link Info | 585 |
| | (FFh) Start Address | | | Track Mode | 586 |
| | End Address | | | Link Info | 587 |

DP1

DP2

DP3

DP4

DP5

DP6

DP7

DP8

DP9

DP10

DP11

DP12

CHARACTER INPUT APPARATUS AND APPARATUS FOR RECORDING AND/OR REPRODUCING A RECORDING MEDIUM

BACKGROUND

1. Field of the Invention

The present invention relates to a character input apparatus and an apparatus for recording and/or reproducing a recording medium, and particularly to a character input apparatus for inputting a plurality of kinds of character data and an apparatus for recording and/or reproducing a recording medium to which a plurality of kinds of character data can be inputted.

2. Background of the Invention

Character input apparatus capable of inputting character information are mounted on a variety of devices.

A recording and reproducing apparatus capable of recording and/or reproducing audio data on and/or from a magneto-optical disk serving as a recording medium has a character input apparatus for inputting character information such as the title of a piece of music and is able to record the inputted character information on a disk.

In a recording and reproducing apparatus using a magneto-optical disk, for example, a user can not only record audio data such as music on the magneto-optical disk and reproduce recorded audio data from the magneto-optical disk, but also record character information such as the title of the disk (title of album) and the title of the tune (track). Upon reproduction, the disk title, the title of the music, the name of the artist, etc., are displayed on a display unit of the apparatus.

A known character input apparatus includes a keyboard having a plurality of keys corresponding to characters that can be entered and is able to enter characters like a computer and a word processor. However, a character input apparatus for a small device or the above-mentioned recording and reproducing apparatus having keys for recording and reproducing mainly sounds, uses only a dial or up/down key as the operation means for selecting characters when character data are entered.

In such a case, the user has to turn the dial or operate the up/down key, i.e., operate the up/down key in the incremental or decremental direction, whereby respective characters can be sequentially selected accordingly.

However, according to the above-mentioned system, when there are many characters that can be entered, such as symbols, capital letters of an alphabet, small letters of an alphabet, numerals or katakana, the user has to endure a tedious effort and a lot of time for selecting characters that should be entered. Therefore, the above-mentioned character input apparatus is not convenient to use. Specifically, it is unavoidable that an amount in which the dial is rotated for selecting desired characters and the number of times in which the keys are pressed is increased.

The arrangement of characters should be set in order to enable characters to be selected by increment/decrement operation.

When capital letters of an alphabet, small letters of an alphabet, numerals, symbols and katakana can be entered, the arrangement order of characters should be set in such a way as in "A", "B", "C", . . . , "Z", "a", "b", "c", . . . , "z", "0", "1", "2", . . . , "9", "!", """, . . . , "#", "ア", "イ", "ウ", . . . , "ン" "゛ (sonant mark)", " ゜ (semi-voiced sound mark)".

However, if characters are selected sequentially from "A" by increment operation each time one character is selected, the number of increment operation becomes extremely large. Even though the increment operation is carried out by turning a jog dial, for example, when the katakana characters of "テイスカ" are inputted, characters are selected sequentially from "A" by increment operation in order to select "テ". Then, at the time "テ" is selected, the enter operation (input determination) is carried out. Then, characters are sequentially selected from "A" again by increment operation in order to select " ゛ (sonant mark)". At the time " ゛ (sonant mark)" is selected, the enter operation (input determination) is carried out. Further, characters are selected sequentially from "A" again by increment operation in order to select "イ". Then, at the time "イ", "イ" is selected, the enter operation (input determination) is carried out. Katakana characters "ス", "カ" are obtained in a similar manner.

As described above, the operation for selecting and entering characters becomes very complicated and takes a significant amount of time. Therefore, the above-mentioned input apparatus is not convenient to use.

SUMMARY OF THE INVENTION

It is therefore an object of the present invention to provide a character input apparatus in which the above-mentioned problem can be solved.

It is another object of the present invention to provide a recording and/or reproducing apparatus of a recording medium in which the above-mentioned problem can be solved.

According to the present invention, there is provided a character input apparatus which includes a memory, an input unit and a controller. A plurality of kinds of character data are stored in the memory. The input unit selects one character data from a plurality of character data stored in the memory and inputs the selected character data. The controller reads out character data from the memory based on the selected input from the input unit and holds the character data determined based on the definite input from the input portion as definite data. The controller automatically reads out first character data from a plurality of character data of the same kind to which definite character data belong when selected data is inputted and definite data is inputted by the input unit after the definite data is inputted by the input unit.

According to the present invention, there is provided a recording and/or reproducing apparatus of a recording medium. The recording medium includes a data recording area in which data are recorded and a management data recording area in which there is recorded management data for managing the data recorded in the data recording area. The apparatus includes a recording and/or reproducing unit, first and second memory units, an input unit and a controller. The recording and/or reproducing unit records data in data of a recording medium or reproduces data recorded in the data recording area of the recording medium. The first memory unit memorizes the management data read out from a management data area of the recording medium by the recording and/or reproducing unit. The second memory unit memorizes therein a plurality of kinds of character data. The input unit selects one character data from a plurality of character data memorized in the second memory unit and inputs selected character data as definite data. The controller controls an operation of the recording and/or reproducing unit based on the management data memorized in the first memory unit. The controller reads out character data from the second memory unit based on selected input from the input unit and holds character data determined based on the input determined by the input unit as definite data. The controller automatically reads out first character data from a plurality of character data of the same kind to which the thus determined character data belongs when the input unit inputs selected data and determined data after the input unit has entered determined data. The controller updates the management data memorized in the first memory unit based on character data string generated by the input unit after the input operation by the input unit has been finished.

According to the present invention, there is provided a recording and/or reproducing apparatus of a recording medium. The recording medium includes at least a first data recording area in which data is recorded and a second data recording area in which address data indicative of recording start position of data recorded on the data recording area, address data indicative of recording end position and character data string for recorded data are recorded. The apparatus includes a recording and/or reproducing unit, first and second memory units, an input unit and a controller. The recording and/or reproducing unit records data in a first data recording area of a recording medium or reproduces data recorded on the first data recording area of the recording medium. The first memory unit memorizes data read out from a second data recording area by the recording and/or reproducing unit. The second memory unit memorizes therein a plurality of kinds of character data. The input unit selects one character data from a plurality of character data memorized in the second memory unit and inputs selected character data as definite data. The controller controls an operation of the recording and/or reproducing unit based on management data memorized in the first memory unit. The controller reads out the character data from the second memory unit based on the selected data inputted from the input unit, and holds the character data thus determined based on the definite data inputted by the input unit as determined data. The controller automatically reads out first character data from a plurality of character data of the same kind to which the thus determined character data belongs when the input unit inputs selected data and determined data after the input unit has inputted definite data. The controller records and updates at least character data string of the data memorized in the first memory unit based on the character data string generated by the input unit after the input operation by the input unit has been finished.

BRIEF DESCRIPTION OF THE DRAWINGS

FIG. 3 is a diagram used to explain a U-TOC sector 0 of a magneto-optical disk used in the present invention;

DESCRIPTION OF THE INVENTION

A recording and/or reproducing apparatus for a recording medium according to the present invention will hereinafter be described in detail with reference to the drawings. In the following embodiment, a magneto-optical disk will be used as a recording medium, and a recording and/or reproducing apparatus having a character input apparatus will be described by way of example.

An apparatus according to the following embodiment is able to input title of musical composition and disk title as track name and disk name corresponding to audio data track or disk by using a character input apparatus.

The present invention will be described in the order which follows:

1. An example of a recording and/or reproducing apparatus having a character input apparatus mounted thereon;
2. U-TOC sector;
3. The sequential order in which inputted characters are arranged; and
4. Character input operation 1. An example of a recording and/or reproducing apparatus having a character input apparatus mounted thereon:

A recording and/or reproducing apparatus having a character input apparatus mounted thereon will be described.

Figure 1:
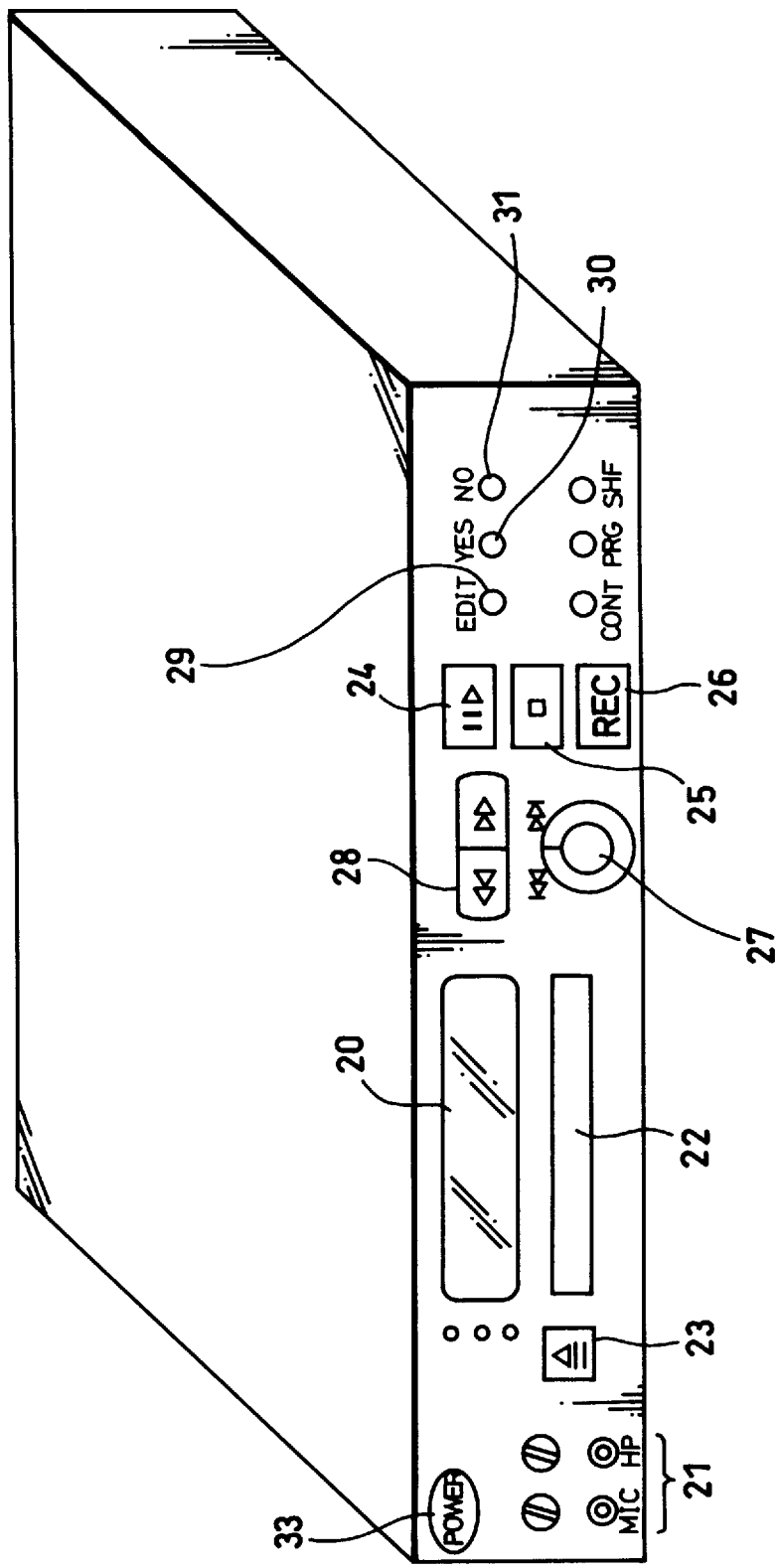
FIG. 1 is a perspective view illustrative of an outer face of a recording and/or reproducing apparatus according to an embodiment of the present invention.

FIG. 1 of the accompanying drawings shows an outer face of a console-type recording and/or reproducing apparatus.

As shown in FIG. 1, the recording and/or reproducing apparatus has a front panel on which a display unit 20 comprising a liquid-crystal display device or the like is formed. The display unit 20 displays operation modes of a disk recorded and/or reproduced, track number, recording time/reproducing time, edit operation state, etc. Although character information can be recorded on the disk as will be described later on, the display unit 20 is able to display inputted characters inputted when character information is inputted and character information read out from the disk.

The front panel has a terminal portion 21 comprising a headphone output terminal and a microphone input terminal and a disk insertion portion 22 through which the disk is inserted into the recording and/or reproducing apparatus and through which the disk is ejected in response to operation of an eject key 23.

The front panel has a variety of operation keys, i.e. a play/pause key 24 for reproducing operation and pause operation, a stop key 25, a recording key 26, an AMS (automatic music search) operation dial (hereinafter referred to as "jog dial") 27 for accessing a starting point of recorded information and a search key 28 or executing a high-speed reproducing operation. These keys 24, 25, 26, 27 and 28 are fundamental operation keys concerning a sound recording/reproducing operation. Although the jog dial 27 serves as an operation unit for instructing AMS when it is rotated, in the disk name input mode or track name input mode which will be described later on, a rotation operation of the jog dial 27 becomes increment/decrement operation for selecting characters. The jog dial 27 can be operated by depression. When the jog dial 27 is depressed, the user can enter information in the disk name input mode or the track name input mode.

The front panel further includes an edit key for accessing and ending a variety of edit modes and a yes key 30 and a cancel key 31 used in edit operation.

As described above, the character input mode for inputting disk name or track name is one of edit modes. The user accesses the disk name input mode or track name input mode by using the edit key 29 and enters characters.

The jog dial 27 is used in the character input operation. When the jog dial 27, for example, is rotated one click in the clockwise direction, an increment operation of one step is effected. When on the other hand the jog dial 27 is rotated one click in the counter-clockwise direction, a decrement operation of one step is effected. For example, when the jog dial 27 is rotated once, an increment or decrement operation of several steps to several 10s of steps is executed. At every step, various characters such as alphabet, numeral, symbol or katakana (the square phonetic Japanese syllabary) are sequentially selected and displayed on the display unit 20. Then, an inputted character is determined by depressing the jog dial 27 (i.e. enter operation) under the condition that a certain character is displayed on the display unit 20.

When characters are selected one by one and entered and the user depresses the edit key 29 or the yes key 30 at a certain time point, an inputted character string is determined and written in the disk. The input operation procedure is not limited to the above-mentioned one and may be variously changed in response to the kind of keys provided in the apparatus.

For example, instead of rotating the jog dial 27, the user may execute increment/decrement operation for selecting characters by pressing an up/down key.

Figure 2:
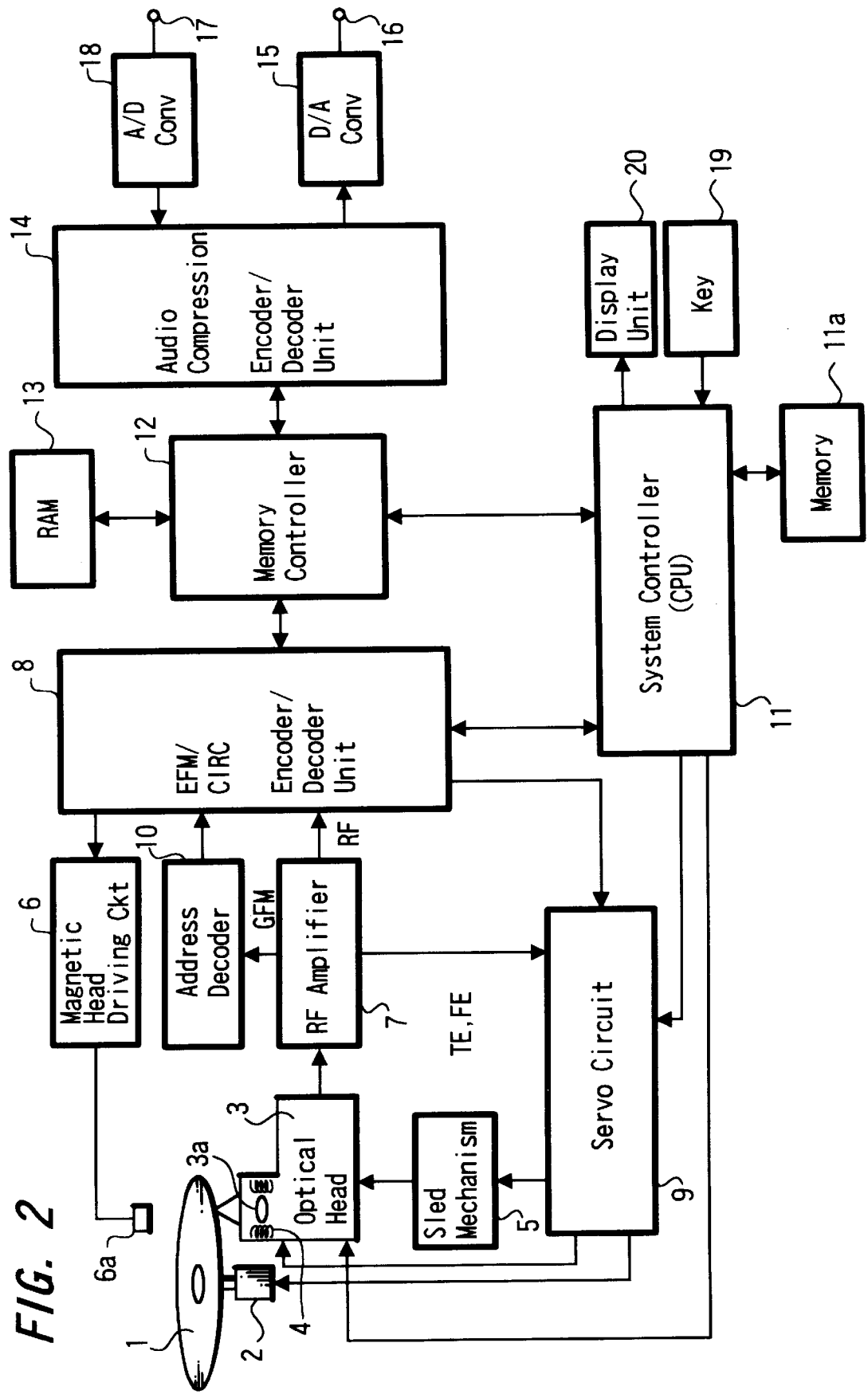
FIG. 2 is a block diagram showing a recording and/or reproducing apparatus according to the embodiment of the present invention.

FIG. 2 is a block diagram showing a recording and/or reproducing apparatus according to the embodiment of the present invention.

As shown in FIG. 2, a magneto-optical disk 1 on which audio data is recorded is rotated by a spindle motor 2. The magneto-optical disk 1 is irradiated with laser beams by an optical head 3 upon recording/reproducing.

The optical head 3 outputs a laser beam of high intensity to heat recording tracks up to a Curie temperature upon recording, and outputs a laser beam of relatively low intensity for detecting data from reflected light based on a magnetic Kerr effect upon reproduction.

To this end, the optical head 3 includes a laser diode serving as a light source, an optical system comprising a polarizing beam splitter or an objective lens and a detector for detecting reflected light. An objective lens 3a is supported by an actuator 4 such that it can be displaced in the disk radius direction (i.e. so-called tracking direction) and in the direction in which it comes close to or away from the disk (i.e. so-called focusing direction).

A magnetic head 6a is disposed at the position in which it is opposed to the optical head 3 across the magneto-optical disk 1. The magnetic head 6a applies a vertical magnetic field modulated by supplied data from the surface side opposite to the optical head 3.

The optical head 3 and the magnetic head 6a can be moved in the disk radius direction by a sled mechanism 5.

By the reproducing operation, information detected from the magneto-optical disk 2 by the optical head 3 is supplied to an RF amplifier 7. The RF amplifier 7 extracts a reproduced RF signal, a tracking error signal TE, a focusing error signal FE and groove information (absolute position information recorded on the magneto-optical disk 1 as pre-grooves (wobbling grooves) GFM by computing information supplied thereto.

The thus extracted reproduced RF signal is supplied to an encoder/decoder unit B. Also, the tracking error signal TE and the focusing error signal FE are supplied to a servo circuit 9 and the groove information GFM is supplied to an address decoder 10.

The servo circuit 9 generates a variety of servo drive signals in response to the tracking error signal TE, the focusing error signal FE supplied thereto, a track jump command, an access command from a system controller 11 comprising a microcomputer and rotational speed detection information from the spindle motor 2 and controls the actuator 4 and the sled mechanism 5 to thereby effect focusing control and tracking control. Also, the servo circuit 9 controls the spindle motor 2 such that the spindle motor 2 rotates at a constant linear velocity (CLV). The system controller 11 is connected with a memory 11a in which there are memorized symbol data such as "!" or " "" in addition to the character data such as alphabet, hiragana (Japanese cursive kana character), katakana and numerals used in the character input mode which will be described later on. These data are read out from the memory 11a in response to a control signal based on input from the jog dial 27 of the operation unit 19 and then displayed on a display unit which will be described later on.

The address decoder 10 decodes the groove information GFM supplied thereto to extract address information. This address information is supplied to the system controller 11, in which it is used for a variety of control operations.

The reproduced RF signal is decoded by the encoder/decoder unit 8 in a suitable manner such as EFM (eight-to-fourteen modulation)-demodulation or CIRC (cross-interleave Reed-Solomon code). At that time, address and subcode also are extracted and supplied to the system controller 11.

Audio data (sector data) decoded by the encoder/decoder unit 8 in a suitable manner such as EFM-demodulation or CIRC is temporarily stored in a buffer memory 13 under control of a memory controller 12. In general, data is read out from the magneto-optical disk 1 by the optical head 3 and reproduced data is transferred in the system from the optical head 3 to the buffer memory 13 at 1.4 Mbits/sec intermittently.

Data written in the buffer memory 13 is read out at a timing in which the reproduced data is transferred at 0.3 Mbits/sec, and supplied to the encoder/decoder unit 14. The data supplied to the encoder/decoder unit 14 is processed in a reproduced signal processing fashion such as decoding for an audio signal compression processing. The thus processed signal from the encoder/decoder unit 14 is converted by a D/A (digital-to-analog) converter 15 and supplied from an output terminal 16 to a predetermined amplifying circuit unit (not shown) from which it is reproduced and then outputted. For example, the above-mentioned analog signal is outputted from the output terminal 16 as L (left-channel) and R (right-channel) analog audio signals.

When information is recorded on the magneto-optical disk 1, a recorded signal (analog audio signal) supplied to an input terminal 17 is converted by an A/D (analog-to-digital) converter 18 and supplied to the encoder/decoder unit 14, in which it is encoded for compressing audio signal.

Recorded data compressed by the encoder/decoder unit 14 is temporarily written in the buffer memory 13 under control of the memory controller 12 and read out from the buffer memory 13 and supplied to the encoder/decoder unit 8. Then, the recorded data is encoded in a suitable manner such as CIRC encoding or EFM by the encoder/decoder unit 8 and supplied to the magnetic head driving circuit 6.

The magnetic head driving circuit 6 supplies a magnetic head driving signal to the magnetic head 6a in response to the recorded data thus encoded. That is, the magnetic head driving circuit 6 supplies an N- or S-pole vertical magnetic field generated by the magnetic head 6a to the magneto-optical disk 1. At that time, the system controller 11 supplies a control signal to the optical head 3 in such a manner that the optical head 3 outputs laser beam of recording level.

An operation unit 19 is operated by the user and equivalent to a variety of operation keys and dial shown in FIG. 1. Operation information entered by these keys and dial is supplied to the system controller 11 and the system controller 11 executes operation control corresponding to operation information.

The display unit 20 is mounted on the housing as shown in FIG. 1 and display operation of the display unit 20 is controlled by the system controller 11.

When information is recorded on/reproduced from the magneto-optical disk 1, management information recorded on the magneto-optical disk 1, i.e., P-TOC (pre-recorded TOC) data and U-TOC (user TOC) data should be read out. Therefore, the system controller 11 identifies address of recorded area and address of reproduced area on the magneto-optical disk 1 in response to these management information.

The above-mentioned management information is stored in the buffer memory 13 so that the buffer memory 13 includes a buffer area for the abovementioned recorded data/reproduced data and the area for holding these management information.

The system controller 11 reads out these management information by effecting a playback operation on the innermost periphery of the disk in which management information is recorded when the magneto-optical disk 1 is loaded onto the recording and/or reproducing apparatus. The management information thus read is memorized in the buffer memory 13 and referred to when the magneto-optical disk 1 is recorded and/or reproduced.

Although the U-TOC data is edited and rewritten in response to recording and erasure of data, the system controller 11 edits the U-TOC data memorized in the buffer memory 13 each time data is recorded/erased. The U-TOC area of the magneto-optical disk 1 is rewritten at a predetermined timing in response to a rewrite operation.

2. U-TOC SECTOR:

The U-TOC sector for managing recording/reproducing audio data or the like on the magneto-optical disk 1 will be described.

While U-TOC data and P-TOC data are provided as TOC data on the magneto-optical disk 1, the P-TOC data is recorded by pits on the innermost periphery of the magneto-optical disk 1 and is read-only information. Positions of a disk recordable area (recordable user area), a lead-out area and a U-TOC area are managed by the P-TOC data.

The P-TOC data need not be described herein because it is not particularly related to the gist of the present invention.

The U-TOC sector may comprise sector 0 to sector 7. The sector 0 is an area which always becomes necessary for recording/reproducing the magneto-optical disk 1. The sector 1 and the sector 4 are areas in which character information are recorded, and the sector 2 is an area in which recording date is recorded. The U-TOC sector 0 which always becomes necessary for recording/reproducing the magneto-optical disk 1 will be described below.

FIG. 3 illustrates a format of the U-TOC sector 0.

The U-TOC sector 0 is a data area in which there is recorded management information with respect to a recordable area (free area) in which musical composition recorded by mainly the user and new musical composition can be recorded.

When a certain musical composition is recorded on the magneto-optical disk 1, for example, the system controller 11 records audio data in a free area which results from searching the free area on the magneto-optical disk 1 from the U-TOC sector 0. Upon reproduction, the system controller 11 identifies the area in which a musical composition to be reproduced from the U-TOC sector 0 and reproduces the above-mentioned musical composition to be reproduced by accessing such area.

As shown in FIG. 3, in the data area (2352 bytes=4 bytes×588) of the U-TOC sector 0 are recorded sync (synchronizing) patterns which comprise 1 byte data of all 0 or all 1 provided at the start position. The sync patterns are added with 4 bytes of addresses of cluster addresses (Cluster H) (Cluster L), sector address (Sector) and mode information (MODE), thereby forming a header.

A sector is a data unit of 2352 bytes and 36 sectors constitute one cluster. The sync patterns and the addresses are not limited to the U-TOC sector 0 but the P-TOC sector and data sector in which audio data is recorded in actual practice are recorded at the sector unit.

The cluster address is recorded at the unit of 2 bytes of a high-order address (Cluster H) and a low-order address (Cluster L) and the sector address (Sector) is recorded at the unit of 1 byte.

Subsequently, at predetermined byte positions are recorded data such as maker code, model code, track number of first track (First TNO), track number of last track (Last TNO), sector used situation (Used sectors), disk serial number and disk ID.

Further, in order to identify areas of tracks (musical compositions) recorded by the user recording and free area by matching them to a management table portion which will be described later on, as corresponding table instruction data portions are prepared areas in which various table pointers (P-DFA, P-EMPTY, P-FRA, P-TNO1 to P-TNO255) are recorded.

As the management table portions which are made corresponding to the table pointers (P-DFA to P-TNO255) are provided 255 part table ranging from (01h) to (FFh). On the respective part tables are recorded start address serving as a starting point of a certain part, end address serving as an end point and mode information (track mode) of such part. Moreover, since it is frequently observed that parts shown by respective part tables are linked to other parts, there can be recorded link information indicative of part table in which there are recorded start address and end address of parts to be linked.

In this specification, numerals with "h" added thereto are expressed in the form of hexadecimal notation. Parts will hereinafter be referred to as "track portion" in which data that are continuous within one track from a time standpoint are recorded physically and consecutively.

The recording and reproducing apparatus of this kind can satisfactorily reproduce one musical composition data by accessing it part by part even when such data is recorded discontinuously from a physical standpoint, i.e., such data is recorded over a plurality of parts. Therefore, musical composition recorded by the user may frequently be recorded over a plurality of parts in order to use the user recordable area more efficiently.

To this end, link information is provided, and part tables can be linked by designating part tables to be linked with numbers (01h) to (FFh) given to each part table.

Specifically, in the management table in the U-TOC sector 0, one part table expresses one part, and hence part positions of a musical composition arranged by linking three parts, for example, can be managed by three part tables which are linked with link information.

In actual practice, link information is indicated by a numeral which is set to a byte position within the U-TOC sector by a predetermined computing processing. That is, link information designates part table as 304+(link information)×8 (bytes).

Contents of respective part tables ranging from (01h) to (FFh) in the management table portion of the U-TOC sector 0 are expressed by table pointers (PDFA, P-EMPTY, P-FRA, P-TNO1 to P-TNO255) in the corresponding table instruction data portion as follows:

The table pointer P-DFA is attached to a defective area on the magneto-optical disk 1 and designates a start part table within one part table or a plurality of part tables in which a track portion (=part) which becomes a defective area due to a scratch is shown. Specifically, when there exists a defective part, any one of (01h) to (FFh) is recorded in the table pointer P-DFA, and a defective part is indicated on the corresponding part table by start address and end address. If there exists other defective parts, then other part tables are designated as link information on the part table and defective parts are illustrated on that part table. If there exist no other defective parts, then link information is set to "(00h)", for example, and it is determined that there will never be other information.

The table pointer P-EMPTY illustrates a start part table of one or a plurality of part tables not used in the management table portion. When there exists any part table which is not used, any one of (01h) to (FFh) is recorded as the table pointer P-EMPTY. When there exists a plurality of part tables which are not used, part tables are sequentially designated by link information from the part table designated by the table pointer P-EMPTY, and all part tables which are not used are linked on the management table portion.

The table pointer P-FRA shows a free area in which data on the magneto-optical disk 1 can be written (including an erase area) and designates a start part table within one or a plurality of part tables in which a track portion (=part) serving as a free area is shown. Specifically, if there exists a free area, then any one of (01h) to (FFh) is recorded in the table pointer P-FRA, and the part which is the free area is indicated on the corresponding part table by start address and end address. If there are a plurality of parts, i.e., if there are a plurality of part tables, then link information is sequentially designated up to the part table which becomes "(00h)" by the link information.

Figure 4:
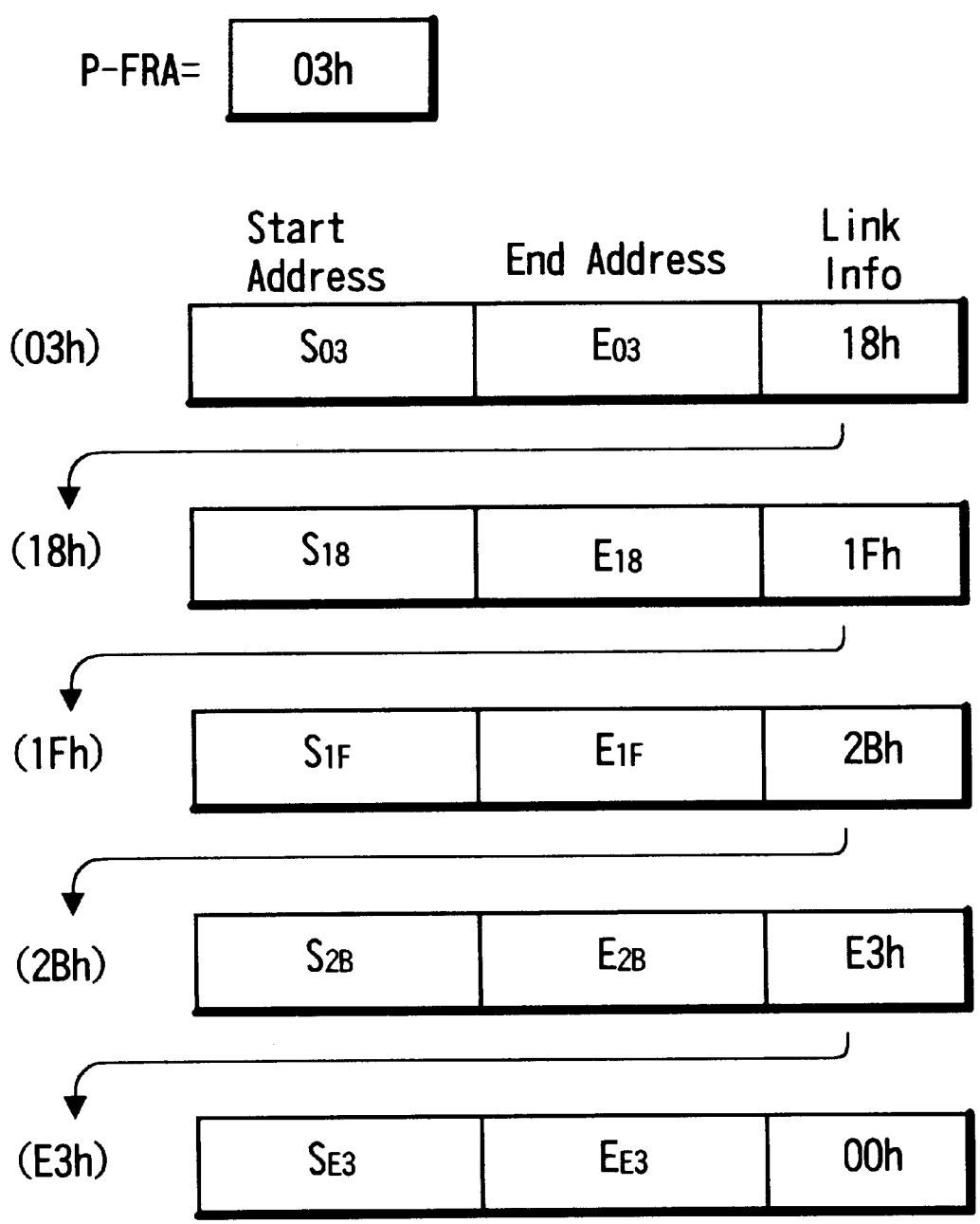
FIG. 4 is a diagram used to explain a link format of the U-TOC sector 0 of the magneto-optical disk used in the present invention.

FIG. 4 schematically illustrates the manner in which parts which become free areas are managed by the part table. Specifically, FIG. 4 illustrates the manner in which the state that the parts (03h)(18h)(1Fh)(2Bh)(E3h) are set to the free areas also is expressed by linking the part tables (03h)(18h)(1Fh)(2Bh)(E3h) after the corresponding table instruction data P-FRA. The manner in which the above-mentioned defective areas and part tables which are not used are managed similarly as described above.

If a magneto-optical disk is a magneto-optical disk in which audio data such as musical composition or audio data is not recorded at all and which has no defect, then the part table (01h) is designated by the table pointer P-FRA, which demonstrates that the whole of the recordable user area of the disk is the free area. In this case, since the part tables of (02h) to (FFh) are not used, the part table (02h) is designated by the above-mentioned table pointer P-EMPTY, the part table (03h) is designated as link information of the part table (02h), . . . , thus part tables are linked up to the part table (FFh). Link information of the part table (FFh) in this case becomes "(00h)" which instructs that part tables will not be linked hereinafter.

Incidentally, with respect to the part table (01h), there is recorded a start address of the recordable user area as start address and address provided immediately before lead-out start address is recorded as end address.

The table pointers P-TNO1 through P-TNO255 show tracks of musical compositions recorded on the magneto-optical disk 1 by the user. The table pointer P-TNO1 shows a part table in which a start part of one or a plurality of parts in which data of the first track is recorded.

When the musical composition of the first track, for example, is not divided in track on the disk, i.e., recorded in the form of one part, the recording area of the first track is recorded as start address and end address in the part table shown by the table pointer P-TNO1.

When the musical composition of the second track, for example, is discretely recorded on a plurality of parts, respective parts are designated in the time-sequential manner in order to show the recording position of the second track. Similarly to the case shown in FIG. 4, from the part table designated on the table pointer P-TNO2, other part tables are designated in the time sequential order by link information so that link information is connected up to part table which becomes "(00h)".

Since all parts on which data comprising the second musical composition are recorded are sequentially designated and recorded, when the second musical composition is reproduced or when information is overwritten on the area of the second musical composition by using data of the U-TOC sector 0, continuous musical information can be reproduced from the discrete parts by accessing the optical head 3 and the magnetic head 6. Moreover, upon recording, information can be recorded by using the recording area more effectively.

Figure 5:
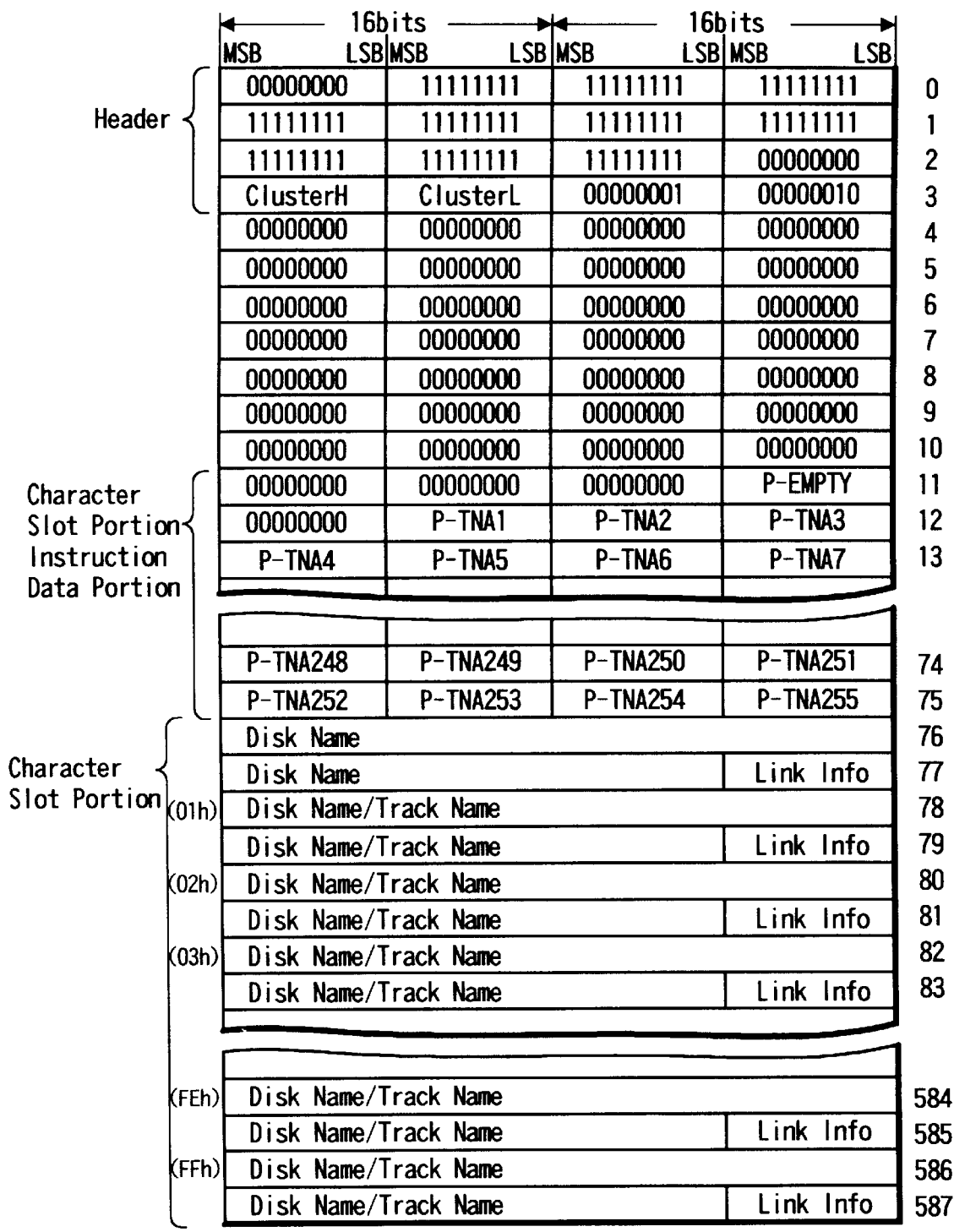
FIG. 5 is a diagram used to explain a U-TOC sector 1 of the magneto-optical disk used in the present invention.

FIG. 5 shows a format of the U-TOC sector 1. This sector is used as a data area in which entered character information is recorded when each recorded track is called by track name or disk title.

As shown in FIG. 5, in this U-TOC sector 1, there are prepared slot pointers P-TNA1 through P-TNA255 as character slot instructing data portions corresponding to respective recorded tracks. The character slot portions designated by the slot pointers P-TNA1 through P-TNA255 are prepared as slots (01h) through (FFh) of 255 bytes at the unit of 8 bytes and used to manage character data in substantially similar form of that of the abovementioned U-TOC sector 0.

Character information serving as disk title or track name are recorded on the slots (01h) through (FFh) in the form of ASCII code. 8 bytes ahead of the slot (01h) are used as a special disk name area.

Characters entered by the user in response to the first track are recorded on the slot designated by the slot pointer P-TNA1. Since slots are linked by link information, entered characters corresponding to one track can be satisfactorily processed even if it becomes larger than 7 bytes (7 characters).

In the U-TOC sector 1, the slot pointer P-EMPTY is used to manage the slot which is not used.

In addition to the U-TOC sector 1, the U-TOC sector 4 is provided as a data area in which entered character information is recorded. Although the format of the U-TOC sector 4 is substantially similar to that of FIG. 5, code data corresponding to Chinese characters and Roman characters are recorded in this sector, and attributes of character codes used as character codes are recorded at predetermined byte positions in addition to data of the sector 1 shown in FIG. 5.

As described above, the recording and/or reproducing apparatus according to this embodiment can record character information such as track names on each corresponding track recorded on the disk by the user. Specifically, when the user designates the track by the operation unit 19 and enters character information, such character is recorded on the corresponding track designated on the U-TOC sector 1. When the user enters character information without designating track, such track is recorded as the character corresponding to the disk in the U-TOC sector 1.

3. The sequential order in which inputted characters are arranged:

In the recording and/or reproducing apparatus corresponding to the above-mentioned magneto-optical disk 1, the character input apparatus according to this embodiment comprises the jog dial 27 of the operation unit 19, the system controller 11 and the display unit 20.

The above-mentioned character input apparatus is able to enter capital letters of alphabet such as "A" to "Z", small letters of alphabet such as "a" to "z", numerals such as "0" to "9", various symbols such as "!", " " (blank), ",", ".", "/", "(♩)", "%", . . . katakanas of "ア", "イ", "ウ", . . . Character data corresponding to respective characters are expressed on the system as 8-bit data according to the ASCII code, memorized in the memory 11a, and character data is recorded on the U-TOC area or read out from the U-TOC area.

In this embodiment, when characters that can be inputted are selected, the system controller 11 determines the order in which characters are arranged. Therefore, when the character input mode is set based on data entered by the operation unit 19, character data are sequentially designated and read out in response to increment/decrement operation of the jog dial 27 in the operation unit 19.

Figure 6:
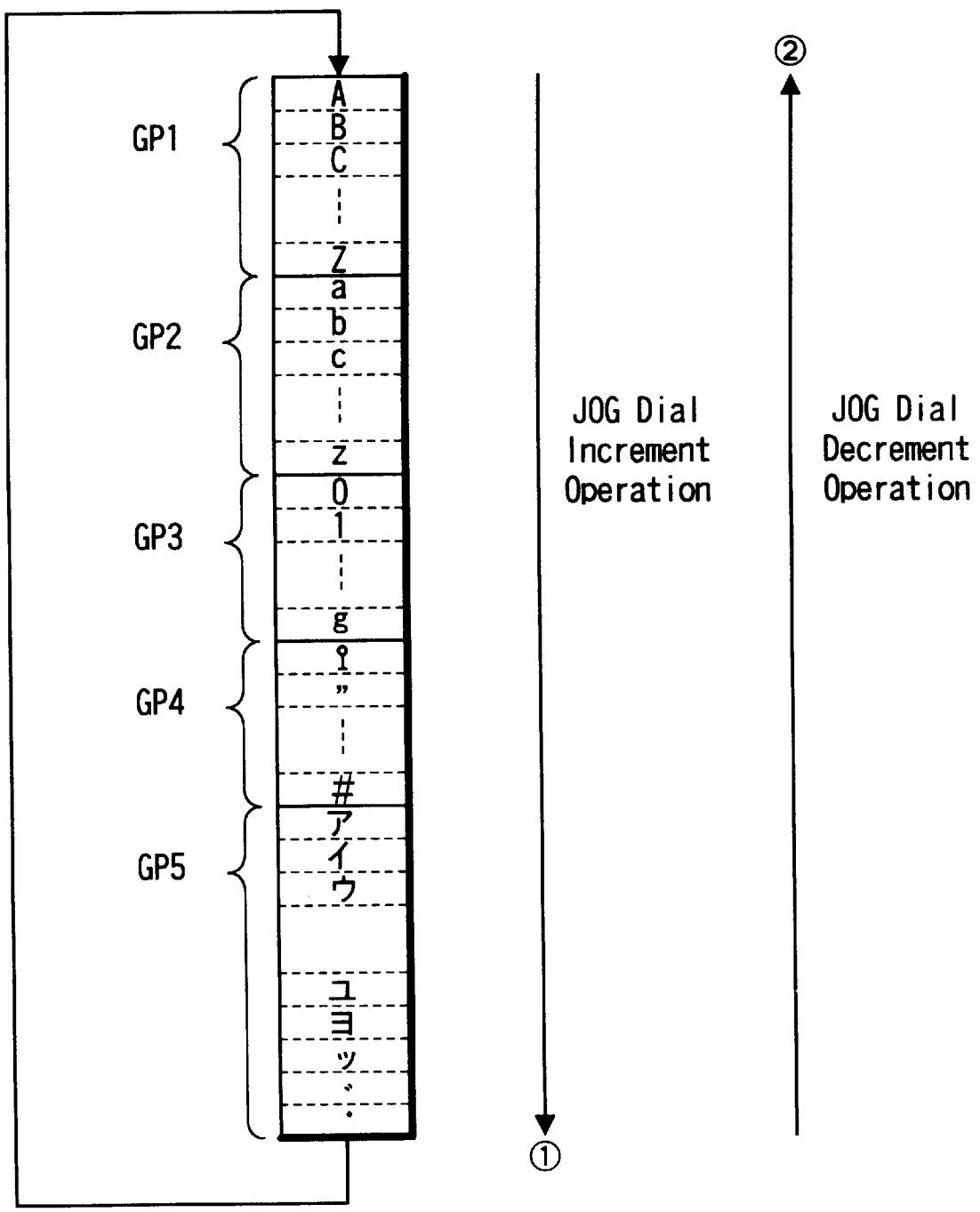
FIG. 6 is a diagram used to explain the order in which character data of a character input apparatus of a recording and/or reproducing apparatus according to the embodiment of the present invention are arranged.

In the memory 11a of the system controller 11 are memorized characters, which can be inputted, in the sequential arrangement order shown in FIG. 6. Specifically, in the memory 11a, there are arranged character data concerning capital letters of alphabet of "A" to "Z" in the order of ascending address. Subsequently, there are arranged character data concerning small letters of alphabet of "a" to "z", character data concerning numerals of "0" to "9", character data concerning various symbols of "!", """, etc., and character data concerning katakana of "ア", "イ", "ウ", . . . , in that order.

As described above, a plurality of character data memorized in the memory 11a are classified at every kind of characters. In this embodiment, data concerning capital letters of alphabet of "A" to "Z" are classified as a capital letter group GP1, data concerning small letters of alphabet of "a" to "z" are classified as a small letter group GP2, data concerning numerals of "0" to "9" are classified as a numeral group GP3, data concerning various symbols are classified as a symbol group GP4 and data concerning katakana are classified as a katakana group GP5, respectively.

As shown in FIG. 6, under the condition that character data are memorized in the memory 11a in the predetermined order, when the jog dial 27 is turned in the incremental direction, character data that should be selected are sequentially changed in the direction shown by an arrow (1) in FIG. 6, i.e., in the sequential order in which characters are arranged. When on the other hand the jog dial 27 is turned in the decremental direction, character data that should be selected are sequentially changed in the direction shown by an arrow (2) in FIG. 6, i.e., in the sequential order opposite to the direction presented by the increment operation. In this embodiment, the predetermined order is referred to as order of A, B, C, . . . if the character data is data concerning the alphabet. If the character data are data concerning katakana and hiragana, then the predetermined order is referred to as order of "ア", "イ", "ウ", . . . , and "あ", "い", "う", . . . and vice versa.

The system controller 11 may be connected with the memory 11a shown in FIG. 2. However, the system controller 11 may not always include a memory table in which ASCII codes of respective characters are arranged but various characters may be designated in the order shown in FIG. 6 in response to the change of numerals presented each time the jog dial 27 is turned in the incremental or decremental direction.

When the groups GP1 through GP5 are set, group identification codes or the like need not be added to character data. However, it is sufficient to provide an identifying means for identifying the type of group to which a certain character belongs when a certain character is designated. In this embodiment, it is sufficient to identify character data of a first character in the arrangement order shown in FIG. 6 in the group to which a certain character belongs.

4. Character input operation:

This section describes the manner in which characters are entered by the character input apparatus according to this embodiment each time the user operates the jog dial 27.

The user enters characters in order to input title of musical composition with respect to a certain track (tune) recorded on the magneto-optical disk 1.

When the user places the character input apparatus in the character input mode by depressing the edit key 29 under the condition that a certain track number is designated, the user can enter characters or a character string corresponding to that track.

If the user ends the character input mode at the time the user enters necessary characters by executing the character input operation, then character data can be recorded on the above-mentioned U-TOC sector 1 in the magneto-optical disk 1 as data concerning characters or character string corresponding to that track. Incidentally, during a period in which character data is recorded on the U-TOC sector 1 of the magneto-optical disk 1, character data or character data string selected and inputted in the character input mode are stored in the RAM (random-access memory) area of the system controller 11 together with other edit data.

If the character input mode is set under the condition that a track is not designated, character input corresponding to the disk, e.g., characters or character string such as album title can be recorded on the magneto-optical disk 1.

The manner in which characters are entered under the condition that any characters are not inputted to a certain track will be described with reference to FIGS. 7, 8 and FIGS. 9A through 9M.

Figure 7:
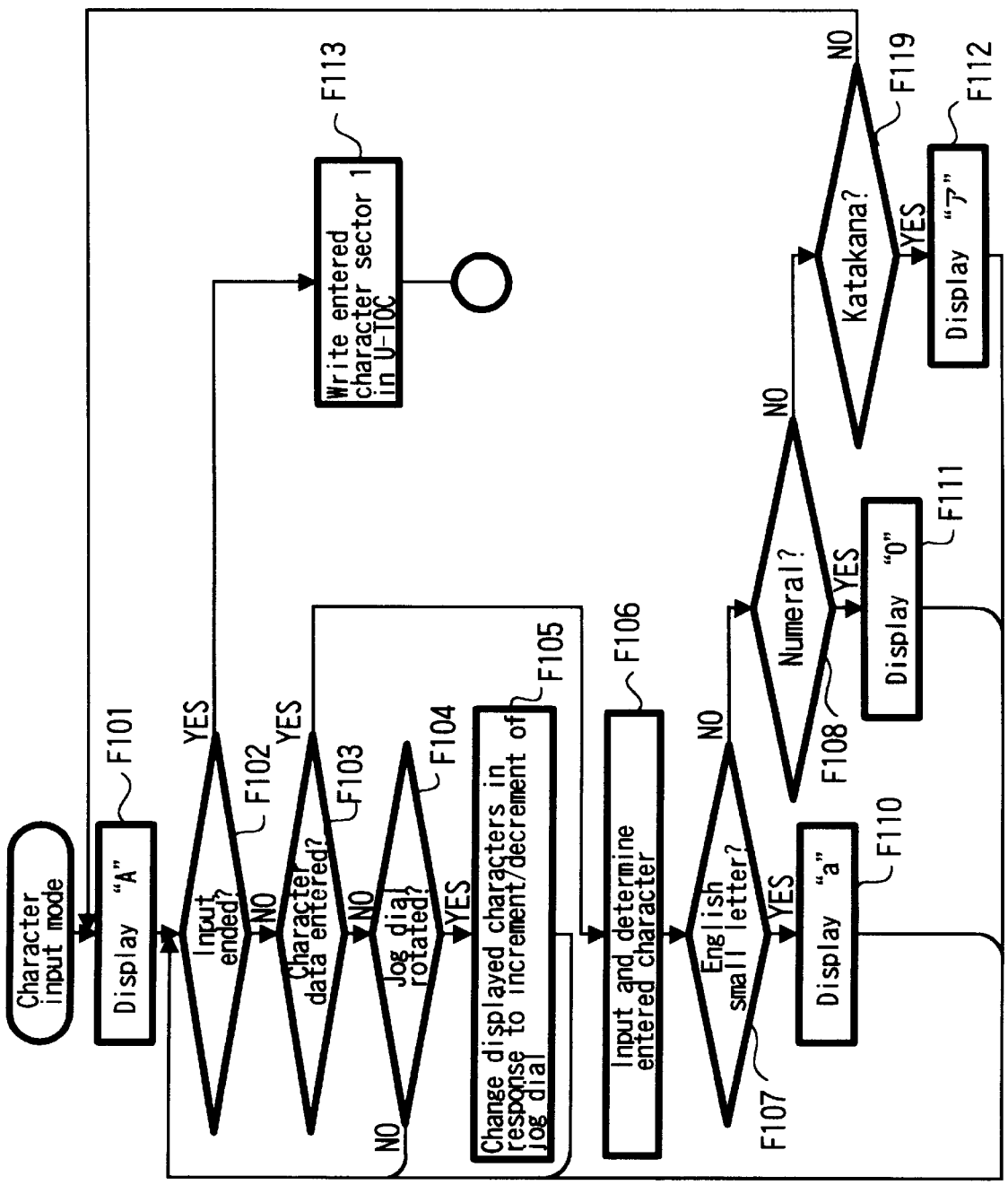
FIG. 7 is a flowchart to which reference will be made in explaining the manner in which the character input apparatus of the recording and/or reproducing apparatus inputs character data.

When the user sets the character input mode by executing operation for presenting the character input mode with the keys on the operation unit 19a, the system controller 11 starts the processing shown in the flowchart of FIG. 7.

Initially, at a step F101, "A" which is the first character of the arrangement order shown in FIG. 6 is displayed. This state is the same as the state of a display pointer DP1 shown in FIG. 8 and the display unit 20 displays a character "A" as shown in FIG. 9A.

Figure 8:
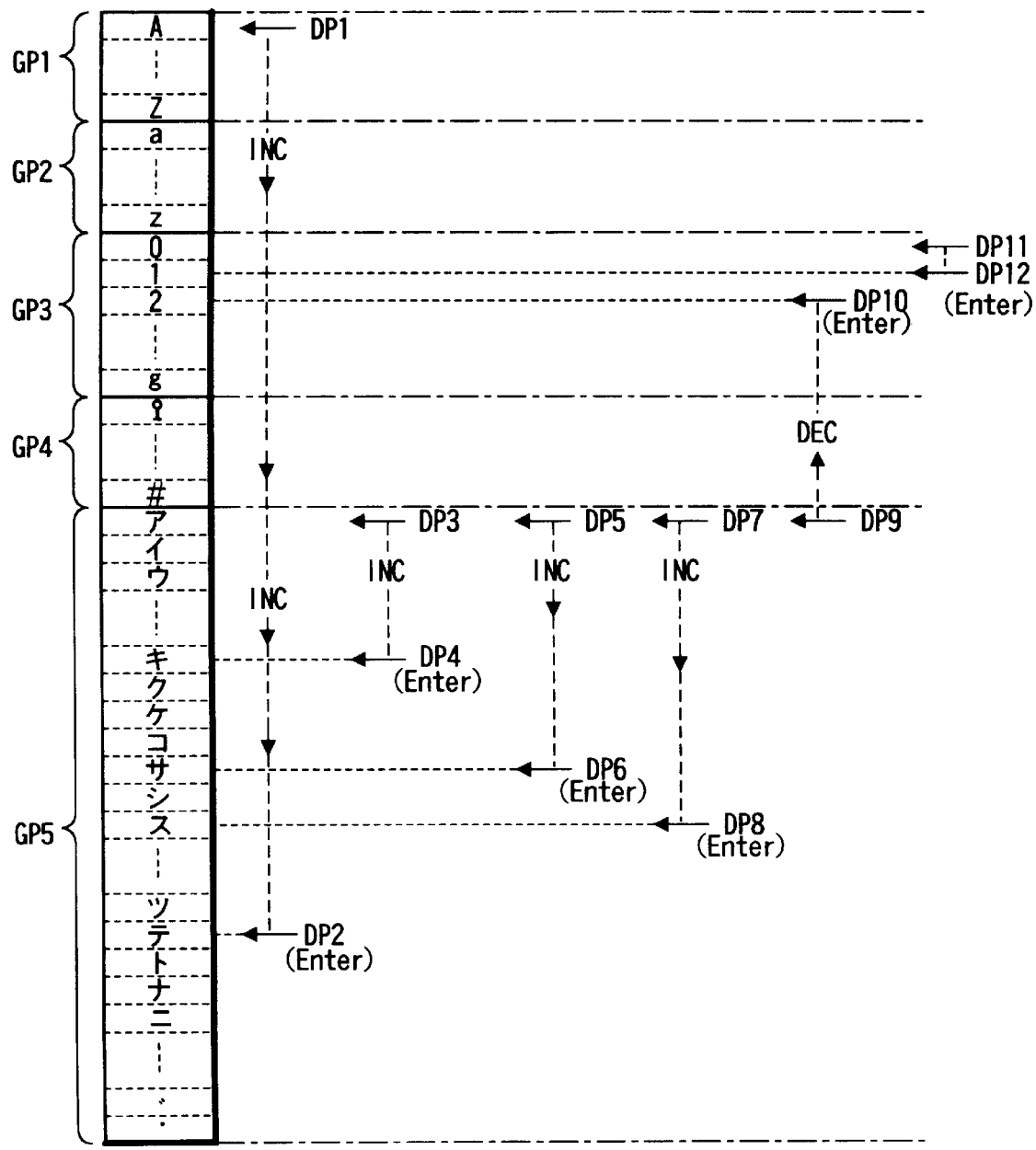
FIG. 8 is a diagram used to explain the manner in which the character input apparatus of the recording and/or reproducing apparatus inputs character data.

A display pointer DP(x) in FIG. 8 is displayed as a pointer for designating a character to be displayed in response to a numerical value that can be varied when the user turns the jog dial 27 in the incremental or decremental direction. This pointer is not an actual pointer but in the software processing in actual practice, a numerical value that can be varied each time the jog dial 27 is turned in the incremental or decremental direction is rendered a function for designating character data concerning characters to be displayed.

Figure 9A:
FIGS. 9A through 9M are diagrams used to explain the manner in which a display unit displays characters when the recording and/or reproducing apparatus according to the embodiment of the present invention inputs characters.
Figure 9B:

FIG. 9A shows the state that the character "A" is blinking. In this embodiment, the blinking state shows that a displayed character is now being selected and is not yet entered.

By way of example, the following processing will be described with reference to the manner in which the characters " テキサス21" are inputted in the character input mode.

Under the display state shown in FIG. 9A, the user selects the character of "テ" by operating the jog dial 27. The system controller 11 displays character designated at every click in response to the operation of the jog dial 27. This operation is the processing executed at steps F104, F105 in FIG. 7. Specifically, each time the jog dial 27 is rotated one click (at every 1/n rotation if one revolution corresponds to n clicks), the display of the first character is changed from "A" to "B", "C", "D", "E" in the sequential order shown by the arrow (1) in FIG. 6.

The system controller 11 moves a display pointer (count value in actual practice) from the state of DP1 in response to the incremental operation of the jog dial 27 as shown by arrows INC in FIG. 8. Characters shown by display pointers in FIG. 8 are those that are displayed on the display unit 20 as they are, and the display on the display unit 20 is changed in the arrangement order shown in FIGS. 9A, 9B, 9C, in that order.

Figure 9C:
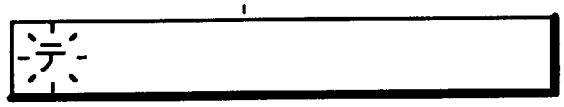

When the user continues to rotate the jog dial 27 to present a display pointer DP2, the display unit 20 is placed in the display state shown in FIG. 9C in which "テ" is displayed as a first character.

When the user executes the enter operation by pressing the jog dial 27, the system controller 11 determines that the input of the first character is "テ" (steps F103 to F106). Each time the input of one character is determined, control goes to a decision step F107, whereat it is determined whether characters determined (entered) at the steps F107, F108, F109 belong to any of the above-mentioned groups GP1 to GP5. Then, the processing corresponding to the judged result is executed at steps F110 to F112. Data concerning the determined character is stored in the RAM area of the controller Specifically, if the entered character is small letter of alphabet in the group GP2 as represented by a YES at the decision step F107, then control goes to the step F110, whereat "a" which is the first character of the group GP2 is displayed on the display unit 20 as the next character. If the entered character is numeral of the group GP3 as represented by a YES at the decision step F108, then control goes to the step F111, whereat "0" which is the first numeral of the group GP3 is displayed on the display unit 20 as the next character. Furthermore, if the entered character is katakana of the group GP5 as represented by a YES at a decision step F109, then control goes to a step F112, whereat "ア" which is the first character of the group GP5 is displayed on the display unit 20 as the next character. Thereafter, control goes back to the step F102.

If on the other hand the entered character belongs to the group GP1 or GP4, i.e., a capital letter of alphabet or symbol, then control goes back to the step F101, whereat "A" which is the first character of the group GP1 is displayed on the display unit 20 as the second character.

Figure 9D:
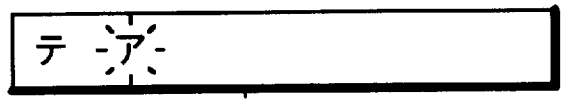

When the character "テ" is entered as described above, control goes to a step F112, whereat the display pointer in FIG. 8 is placed in the state of DP3 and the display unit 20 displays "ア" as the second character as shown in FIG. 9D.

Figure 9E:
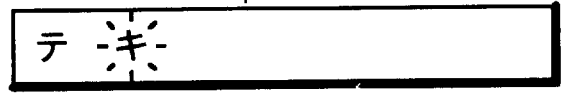

Then, in order to select "キ" of the second character, the user rotates the jog dial 27 so that "キ" is displayed on the display unit 20. The system controller 11 executes the processing at the steps F104, F105 in response to the incremental operation. At the time the display pointer is placed in the state of DP4 in FIG. 8 by the incremental operation, the display unit 20 displays "キ" as the second character as shown in FIG. 9E. Then, when the user executes the enter operation, the inputted character "キ" is determined (steps F103, F106). Since the determined character "キ" is katakana, control of the system controller 11 goes to the step F112 and then goes back to the step F102.

Figure 9F:
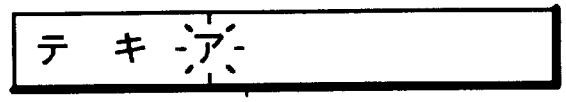

Accordingly, the display pointer is placed in the state of DP5 in FIG. 8 and the display unit 20 displays "ア" at the position of a third character as shown in FIG. 9F.

Figure 9G:
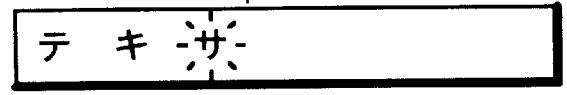

Subsequently, in order to select the third character, "サ", the user rotates the jog dial such that "サ" is displayed on the display unit 20. The system controller 11 executes the processing at the steps F104, F105 in response to the incremental operation. At the time the display pointer is placed in the state of DP6 in FIG. 8, the display unit 20 displays "サ" as the third character as shown in FIG. 9G. Then, when the user executes the enter operation, the inputted character "サ" is determined (steps F103, F106). Since the determined character "サ" also is katakana, control of the system controller 11 goes to the step F112 and then goes back to the step F102.

Figure 9H:

Accordingly, the display pointer is placed in the state of DP7 in FIG. 8 so that the display unit 20 displays "ア" at the position of a fourth character as shown in FIG. 9H.

Figure 9I:
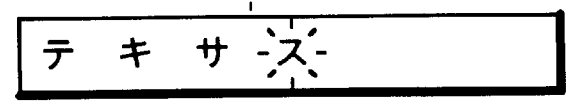

The fourth character is selected similarly. Under the condition that "ス" is displayed on the display unit 20 as shown in FIG. 9I (state of DP8 in FIG. 8), when the user executes the enter operation, "ス" is determined as the fourth character (steps F103, F106). Since the determined character "ス" is katakana, control of the system controller 11 goes to the step F112 and then goes back to the step F102.

Figure 9J:
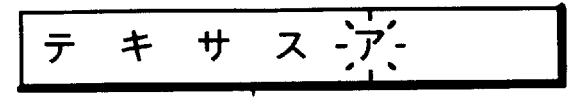

Accordingly, the display pointer is placed in the state of DP9 in FIG. 8 so that the display unit 20 displays "ア" at the position of a fifth character as shown in FIG. 9J.

Then, "2" is entered as the fifth character. To this end, the user rotates the jog dial 27 in the decremental direction so that "2" is displayed on the display unit 200. That is, the system controller 11 executes the processing at the steps F104, F105 to thereby change the display pointer from DP9 to DP10 in FIG. 8.

Figure 9K:
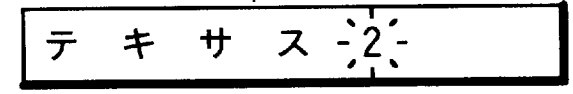

At the time the display pointer is placed in the state of DP10 in FIG. 8, the display unit 20 displays "2" as the fifth character as shown in FIG. 9K. Then, when the user executes the enter operation, "2" is determined (steps F103, F106). Since the determined character "2" is a numeral, control of the system controller 11 goes to the step F111 and then goes back to the step F102.

Figure 9L:
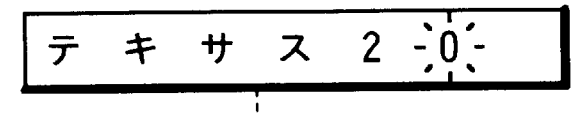

Accordingly, the display pointer is placed in the state of DP11 in FIG. 8 so that the display unit 20 displays "0" at the position of a sixth character as shown in FIG. 9L.

Figure 9M:
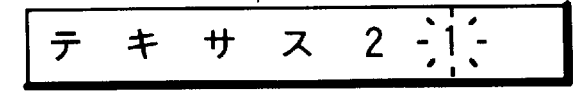

Finally, the sixth character is selected. When the user enters character data under the condition that "1" is displayed on the display unit 20 as shown in FIG. 9M (state of DP12 in FIG. 8), "1" is determined as the sixth character (steps F103, F106). Control of the system controller 11 goes to the step F111 and then goes back to the step F102.

If the user ends the input of character data by using the keys on the operation unit 19, then control goes from the step F102 to the F113, whereat " テキサス21" is finally determined as inputted characters and become data indicative of updated contents for U-TOC data. The system controller 11 writes this character data string in the slot on the U-TOC sector 1 corresponding to the designated track and ends the character input mode.

When the U-TOC data is updated, at this time, the UTOC data stored in the buffer memory 13 is updated. In actual practice, the U-TOC data is updated when the magneto-optical disk 1 is ejected from the recording and/or reproducing apparatus or when the power of the recording and/or reproducing apparatus is turned off.

As described above, according to this embodiment, after an inputted certain character is determined, when the next character is selected, the first character of the group to which the determined character belongs is used as a starting point for increment/decrement operation.

When character data are inputted in actual practice, it is frequently observed that characters belonging to the same group are selected continuously. Accordingly, since the starting point concerning the increment/decrement operation for selecting the next character is set to the starting character of the group of the previously-entered character, it is possible to reduce an amount in which the jog dial 27 is operated until a desired character is selected. Therefore, the character input apparatus becomes very easy to operate and character data can be entered in a short period of time.

While the display unit 20 displays the character which becomes the starting point for effecting increment/decrement operation to select the next character immediately after a certain character was entered as described above, the next character of the entered character may be displayed as "blank". At the time the next increment/decrement operation is executed, a character of the starting point may be selected from starting point characters set in response to the immediately-preceding entered character. A modified example will be described below with reference to the displayed states shown in FIGS. 9C and 9D. At the time point "テ" is entered, the display unit 20 displays "テ" in the form of "テ" in which the second character is blanked. At the time in which the increment/decrement operation is carried out one click amount in order to select the second character, "ア" which becomes the starting point for selecting the second character is displayed as shown in FIG. 9D. Then, the display of the second character will hereinafter be changed in response to the operation.

While the recording and/or reproducing apparatus having the character in put apparatus has been described so far by way of example, the principle of the present invention may be applied to any device in which inputted characters are selected by increment/decrement operation in a dial operation unit or a key operation unit.

A system for grouping characters, the number of groups and selection of characters contained in each group may be set in accordance with various conditions such as circumstances in which a device according to the present invention is used, the kinds of characters that can be entered and circumstances of design.

Further, the arrangement order may not always be limited to the rotational ring form. Furthermore, the input operation means may only perform at least one of increment operation and decrement operation.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. In an apparatus that uses a recording medium for recording or reproducing in which said recording medium includes a data recording area in which data is recorded and a management data recording area in which management data for managing said data recorded on said data recording area is recorded, said apparatus comprising:

recording or reproducing means for recording data in said data recording area of said recording medium or reproducing data recorded on said data recording area of said recording medium;

first memory means for storing therein said management data read out from said management data area of said recording medium by said recording or reproducing means;

second memory means in which character data are memorized, wherein the character data includes characters, and wherein each character belongs to one of a plurality of groups;

input means for selecting one character data from a plurality of character data memorized in said second memory means and determining and inputting selected character data; and control means for controlling operation of said recording or reproducing means based on management data stored in said first memory means, in which said control means reads out character data from said second memory means based on selected inputted character data from said input means and holds determined character data as determined data, said control means automatically reads out first character data of a plurality of character data of a same group to which said determined character data belongs from said second memory means when said input means selects and inputs character data after said input means has determined and inputted character data, and said control means updates management data memorized in said first memory means based on a character data string generated by said input means after said input means has finished input operation.

2. The apparatus of claim 1, in which said plurality of character data are classified into the group into which each character belongs and stored in said second memory means in accordance with a predetermined order.

3. The apparatus of claim 1, further comprising display means for displaying data based on said management data memorized in said first memory means and character data read out from said second memory means, and in which a user selects and determines inputted data by using said input means while confirming character data outputted from said display means, and said control means automatically reads out first character data from a plurality of character data of the same group to which said determined character data belongs from said second memory means and displays the first character data.

4. The apparatus of claim 1, in which said first memory means comprises a first memory area in which management data read out by said recording or reproducing means is stored and a second memory area in which data read out from a recording medium or data recorded on a recording medium is stored temporarily.

5. In an apparatus that uses a recording medium for recording or reproducing in which said recording medium includes at least a first data recording area in which data is recorded and a second data recording area in which address data indicative of a recording start position of data recorded on said data recording area, address data indicative of a recording end position and a character data string for said recorded data are recorded, said apparatus comprising:

recording or reproducing means for recording data in said first data recording area of said recording medium or reproducing data recorded on said first data recording area of said recording medium;

first memory means for memorizing therein data read out from said second data recording area of said recording medium by said recording or reproducing means;

second memory means in which character data are memorized, wherein the character data includes characters, and wherein each character belongs to one of a plurality of groups;

input means for selecting one character data from a plurality of character data memorized in said second memory means and determining and inputting said selected character data;

control means for controlling operation of said recording or reproducing means based on said data memorized in said first memory means, in which said control means reads out character data from said second memory means based on selected data inputted by said input means and holds said determined character data as determined data based on determined data inputted by said input means, said control means automatically reads out first character data from a plurality of character data of a same group to which said determined data belongs from said second memory means when said input means selects and inputs character data after said input means has determined and inputted character data, and said control means records and updates management data regarding at least a character data string from management data memorized in said first memory means based on said character data string generated by said input means after said input means has finished input operation.

6. The apparatus of claim 5, in which said plurality of character data are classified into the group into which each character belongs and stored in said second memory means in accordance with a predetermined order.

7. The apparatus of claim 6, in which said plurality of character data memorized in said second memory means are character data corresponding to at least alphabets, katakana (the square phonetic Japanese syllabary), hiragana (Japanese cursive kana character) and numerals.

8. The apparatus of claim 5, further comprising display means for displaying data based on said management data memorized in said first memory means and character data read out from said second memory means, and in which a user selects and determines inputted data by using said input means while confirming character data outputted from said display means, and said control means automatically reads out first character data from among a plurality of character data of the same group to which said determined character data belongs from said second memory means and displays the first character data.

9. The apparatus of claim 5, in which said first memory means comprises a first memory area in which management data read out by said recording or reproducing means is stored and a second memory area in which data read out from a recording medium or data recorded on a recording medium is stored temporarily.

* * * * *